Jan. 29, 1963 H. R. LUBCKE 3,076,094

RADIOACTIVITY DETECTOR

Filed Feb. 19, 1959

INVENTOR.

Harry R. Lubcke

United States Patent Office 3,076,094

Patented Jan. 29, 1963

3,076,094
RADIOACTIVITY DETECTOR

Harry R. Lubcke, 2443 Creston Way, Hollywood, Calif.

Filed Feb. 19, 1959, Ser. No. 794,288
6 Claims. (Cl. 250—83.3)

My invention relates to a method of and apparatus for detecting radioactivity, characterized by the removal of inhibition toward oscillation of an electrical circuit upon radioactive irradiation.

The methods and apparatus of the prior art for detecting radioactivity have been relatively complicated and difficult to maintain in operating condition. The known ionization chambers, proportional counters and Geiger-Müller counters have required high output resistors, of the order of $10^{11}$ ohms, because of their high internal impedance; high operating potentials, of the order of thousands of volts, have been of relatively large size; and some have required gas under a pressure of thousands of pounds per square inch. Because of a relatively low value of electrical output these detectors have also required high amplification. It has been necessary to provide "direct current" amplification or to provide additional means to transform the initial electrical energy levels to alternating current for amplification.

I have discovered that a suitably inhibited semiconductor oscillator constitutes a sensitive detector of radioactivity.

Briefly, I form a transistor oscillator having suitable adjustable resistors in the transistor electrode circuits, an acceptor metal such as copper in contact with the semiconductor material and a source of weak light irradiation also for the semiconductor material. Upon suitable adjustments of this combination oscillation of the electrical circuits are inhibited. Under such adjustments irradiation by radioactivity decreases the inhibition and causes an amplitude of oscillation corresponding to the radioactive radiation.

The oscillatory electrical output is already an alternating current at a relatively high energy level, making amplification an easy matter. A rectifier gives the envelope of the oscillation and an indicating meter or recorder may be the terminating instrument.

An object of my invention is to provide a novel method of detecting radioactivity.

Another object is to provide simple apparatus for detecting radioactivity.

Another object is to provide a small and light-weight detector of radioactivity.

Another object is to provide a detector of radioactivity which gives a relatively high electrical output at low impedance and which operates at low voltages.

Another object is to provide a simple well logging device.

Other objects will become apparent upon reading the following detailed specification and upon examining the accompanying drawing, in which are set forth by way of illustration and example a certain embodiment of my invention.

Figure 1:
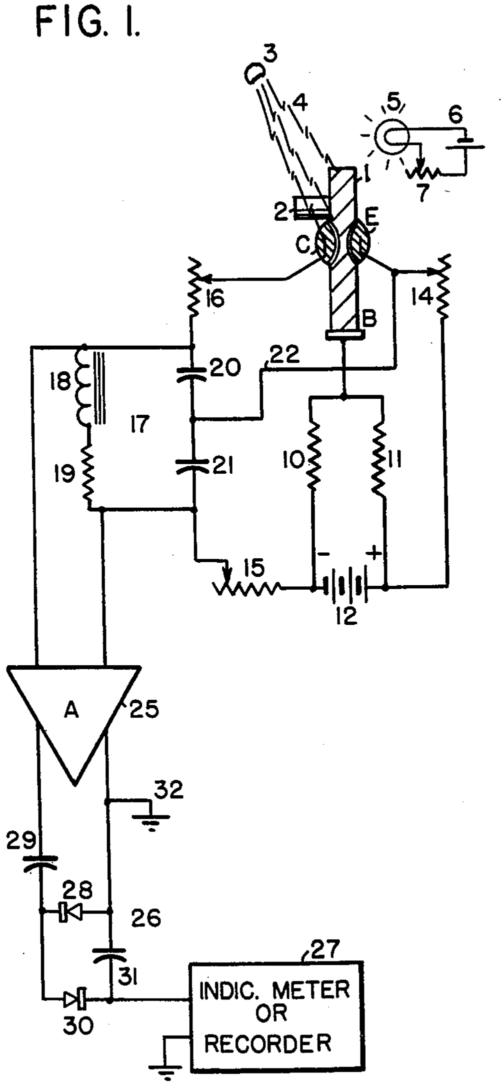
FIG. 1 shows the invention, in partly diagrammatic and partly schematic form.

In FIG. 1 numeral 1 indicates a sectional view of a slice of semiconductor, such as "n" germanium. This is formed into a transistor by an emitter indium dot E and a collector indium dot C by known heating in an oven to form "p" germanium at the interfaces with the germanium slice 1. Element 2 is a copper electrode. It is held in good electrical contact with the germanium slice near one of the junctions, as C. An electrical connection is not made to the copper; it functions in the presence of the radioactivity.

Element 3 is representative of a source of radioactivity; one emitting at least gamma rays, which are indicated by the lightning lines 4.

A small incandescent lamp 5 is placed close enough to slice 1 to irradiate it with visible light, preferably in the yellow spectrum and having the capability of providing an illumination of the order of one tenth foot candle. Any suitable means of energizing and controlling the illumination from this lamp is suitable, as battery 6 and rheostat 7.

In the electrical circuit of the device, base B connecting to the germanium slice 1 is connected to the junction of a voltage divider formed of resistors 10 and 11. The former has a resistance of the order of 3,000 ohms and the latter about two-thirds this value. This voltage divider is connected across a simple prime source of electrical energy for my device, battery 12, which may have a voltage in the 3 to 4½ volt range. Resistor 11 is connected to the positive terminal of this battery. Rheostat 14 also connects to the positive terminal of the battery 12 and also directly to emitter E of the transistor. This resistor has a value range of from twenty to two-hundred thousand ohms.

The negative terminal of battery 12 connects to another variable resistor 15, having a range of from a few to twenty-five thousand ohms. A third variable resistor 16 connects directly to collector C and to one terminal of the resonant circuit generally identified as 17.

The inductive side of the resonant circuit 17 is comprised of inductor 18 and resistor 19. The former has an inductance of the order of one henry and the latter a resistance of approximately 2,000 ohms. The resistance of the inductor, which inductor may be small and of relatively low "Q," is included in the 2,000 ohm figure, so that the resistor per se may often have a value less than 2,000 ohms.

The capacitive side of the resonant circuit consists of two capacitors 20 and 21, each of which have a value of the order of one-hundredth microfarad.

A tap from the junction between the two capacitors, conductor 22, passes directly to emitter E.

This electrical circuit is capable of oscillating at a frequency of the order of a few hundred cycles. The frequency of oscillation may be varied by the resistors, particularly resistor 15.

An amplitude of oscillation of the order of one hundredth of a volt (0.01 v.) is characteristic across the resonant circuit 17 for radioactivity from a source of the order of one tenth microcurie ($10^{-7}$ curies). Accordingly, the electrical response may be viewed directly upon an oscilloscope of the usual type having an input amplifier also of the usual type as a deflection of several millimeters.

However, a more sophisticated indicating arrangement consists in providing amplifier 25 having a gain of the order of two hundred (200) times, a rectifier assembly 26 and an indicating meter or recorder 27.

The amplifier is of the alternating current type capable of amplifying frequencies of the order of a few hundred cycles. It may therefore be of high gain per stage, may be transistorized for small size and low operating power requirements, and may employ feedback for operating stability.

The output of the amplifier is impressed across diode 28 through capacitor 29. The former may be a semiconductor diode, as germanium or silicon, and the later have a capacitance of the order of 0.2 microfarads. A second diode 30 and a second capacitor 31 form a voltage doubler rectifier. The second diode is like the first and the second capacitor has a capacitance half that of the first. The polarity of the second diode is opposite to that of the first and the second diode is shunted across the first through capacitor 31, and this in the leg opposite to the position occupied by capacitor 29. The leg having capacitor 31 is grounded or otherwise made to constitute a common terminal, as indicated at 32.

Element 27 may be a D'Arsonval indicating meter suited to operate in the volt range, or the known moving paper and pen type recorder also available as a unit to accept a constant or slowly varying electrical energy and draw a corresponding trace.

Sensitivity to relatively weak radioactivity in the range previously mentioned is obtained by a careful adjustment of the degree of inhibition of oscillation and of the proper choice of internal element values for the oscillator circuit.

For any given set of conditions obtaining in the detector in its electrical, illumination and auxiliary electrode aspects only one of the several variable controls shown need be variable; i.e., one of the group 14, 15, 16, and preferably 16.

In order to set up the detector, the structure is first completed as shown in FIG. 1. Next, the visible illumination from source 5 is adjusted to a necessary value, of the order of one-tenth foot candle. It will be found that the application of the visual illumination upon the semiconductor wafer will inhibit oscillation; i.e., a given setting of the electrical controls 14, 15, 16 just causing oscillation in relative darkness will not cause oscillation in the presence of incandescent illumination. The resistive value previously stated for variable resistor 14 was from a resistive value in the ohms range to a value of 200,000 ohms. An equivalent value range is used for variable resistor 16. On the latter resistor the "illumination equivalent" of the resistor setting to just give oscillation is of the order of a thousand ohms. In other words, if the resistance value of resistor 16 is decreased to just cause oscillation under relatively dark conditions upon the semiconductor, then that resistor must be reduced a thousand ohms further in order to cause oscillation when the semiconductor is illuminated by incandescent source 5 as has been described.

In the same manner, the copper electrode 2 has a "contact equivalent" of a few thousand ohms.

The detector is sensitized to radioactivity by suitable adjustment of the illumination, the copper electrode and the resistive "equivalents."

In the embodiment shown and described the contact area of the copper electrode 2 was approximately two square millimeters, the illumination characteristics have been stated and a preferred set of resistance values are; for resistor 15, 5,500 ohms, for resistor 14, 129,000 ohms, and for resistor 16, 147,000 ohms.

Under these conditions, without radioactive sample 3 in proximity a very slight noise level composed of relatively short duration random impulses occurs. Upon sample 3 being brought to close enough proximity to give radioactivity of a tenth microcurie an oscillation of amplitude of one-hundredth volt above the noise level occurs.

Under somewhat similar conditions, and with the same apparatus, another set of resistor values for operation were; resistor 15, 300 ohms, resistor 14, 90,000 ohms, and resistor 16, 138,000 ohms.

A theory of operation is not a necessary part of this invention, but what appears to be happening is as follows.

Semiconductors are known to be photoelectric. In the circuit of the invention this effect acts opposite to the mechanism required for transistor operation. For example, electron and/or hole carriers are removed from the transistor operation domain by the photoelectric effect. Conversely, radioactivity provides additional carriers; for example, gamma radiation has been shown to so do.

In a manner similar to the photoelectric effect the presence of the copper electrode acts as a recombination center (electrons and holes) and so also robs the transistor mechanism of operation. This the radioactivity also overcomes, at least in net effect.

An upper limit of detection is set for my device by the radioactivity which produces a permanent or semi-permanent damage to the semi-conductor body, particularly the transistor junctions. This limit is reached in reactors where a gamma field of about $10^5$ roentgens per hour is obtained, but a very great range of useful measuring values between the feeble radioactivity previously mentioned and the high values of the same in and about reactors obviously obtains.

Irradiation by neutrons of greater than thermal velocities is known to damage semiconductors. If the irradiation is weak the transistor will have a relatively long life and vice versa. A total number of neutrons per square centimeter of about $10^{10}$ is a maximum.

Figure 2:
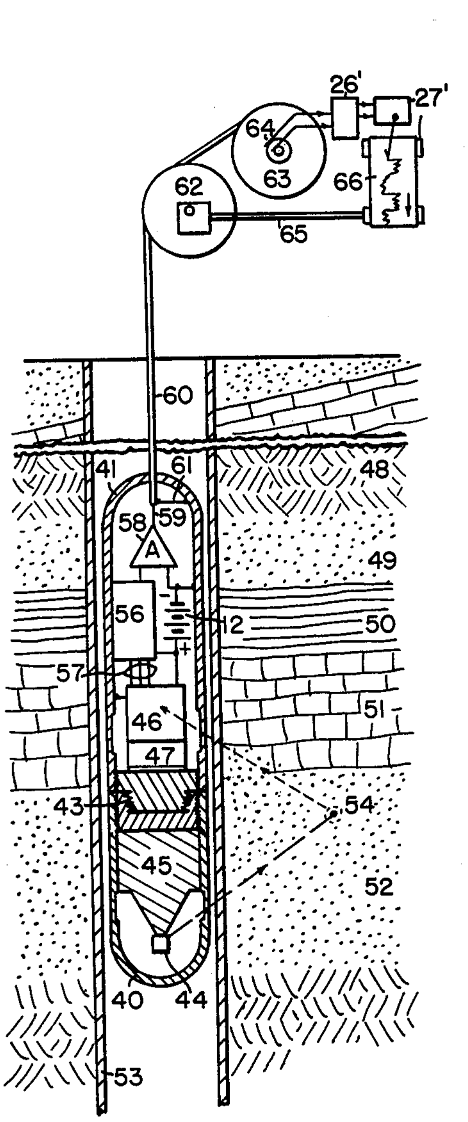
FIG. 2 shows it applied to radioactivity well logging.

FIG. 2 shows how my invention may be applied to the art of radioactivity well logging. A down-well tool is constructed of steel or equivalent structurally strong material in two parts, 40 and 41. The former is the bottom part and may be detached by unscrewing from the latter upper part at threads 43. The bottom part contains a source of radioactivity, as a one-third curie radium-beryllium emitting neutrons, 44. It also contains a thick lead or hydrogenous shield 45. This is positioned between the source 44 and the detector, which latter is mounted in the lower part of upper tool 41, at 46. Below this may be mounted an ice compartment or equivalent cooling means 47, provided for the purpose of maintaining the semiconductor detector at a relatively constant temperature not exceeding room temperature when the tool is placed in wells where the temperature is higher than that temperature. When the means 47 contains ice ($H_2O$) it provides additional hydrogenous material for shielding purposes.

With the bottom part 40 detached from the tool the remainder 41 provides means for determining the natural (gamma) radioactivity of the several strata 48, 49, 50, 51, 52, etc. and since each has a characteristic amount of radioactivity the stratified structure is revealed. This information can be obtained in spite of the presence of the usual oil (or water) well casing 53, as known.

When the whole tool is employed the formation is irradiated with neutrons from source 44. As an example, one of the many such neutrons passes out of the thinner portion of lower part 40 and enters the nucleus 54. A "capture gamma" ray is emitted and in this ideal illustrative case it returns to the bore hole and impinges upon the semiconductor detector in compartment 46. This process also gives data concerning the geologic structure and formations surrounding the bore hole, particularly with respect to the hydrogen atom content thereof, as is known to the art.

In this application large transistor surfaces may be formed in the semiconductor and/or a number of matched transistor structures may be employed in parallel to increase the area receptive to gamma rays and thus the sensitivity of the device for the purpose intended. Because the frequency of oscillation is a relatively low audio frequency no problem exists because of increased junction capacitance or of minor inequalities in characteristics of paralleled junction structures.

In the tool, compartment 46 contains the semiconductor proper (1) and other immediately adjacent elements of FIG. 1 such as light source 5 and possibly resistive elements 14, 16, etc. While all of the circuit elements may be so located, this is not necessary, and in FIG. 2 a second compartment 56 is provided. The latter may contain such elements as the resonant circuit 17. Compartments 46 and 56 are connected by wires 57 as shown in FIG. 2. Battery 12 is shown in FIG. 2 as located in the general volume of the tool part 41, with necessary wire connections to the adjacent compartments.

An amplifier 58 of the nature of amplifier 25 of FIG. 1 is shown in the upper portion of tool part 41. The electrical oscillatory output from compartments 46 and 56 enters the input of amplifier 58, as before. The output of this amplifier is connected to an insulated inner conductor 59 of logging cable 60, while the common or ground connection of my circuitry is connected electrically to the outer steel strands of cable 60 by conductor 61.

Cable 60 passes over a depth-measuring and chart-drive pulley 62 and thence to cable drum 63. Here both the inner and outer conductors of the cable are separately connected to the two commutator-brush assemblies 64. Apparatus element 26' contains the rectifier similarly identified in FIG. 1. This is electrically connected to the assemblies 64 as to input and to recorder 27' as to output, also as in general the same as FIG. 1.

Drive shaft 65 or its selsyn motor-generating equivalent moves chart paper 66 so that a trace related to depth of the tool in the well is obtained. A casing collar locator may also be included in the tool and indications obtained on the chart, as known.

The several advantages of my type of radioactivity detector become evident when it is applied to well logging.

Because the electrical power required by my device is so small and at such low voltage compared to prior practice, there is no need to send electric power down the cable 60, as is universally practiced at present. This allows a less expensive cable having only low voltage insulation to be used, than at present. It is understood that amplifier 58 may be a transistorized amplifier, and thus may be operated from battery 12 or a small duplicate.

These voltage requirements are much the opposite to the requirements of the known photomultiplier used universally with the known scintillation detectors. This is because the photomultiplier requires a voltage usually of about a thousand volts.

An amplitude of electrical energy is obtained with my detector for impressed radioactivity in proportion thereto. This is very much different than the ultimate electrical response of the Geiger counter, scintillation counter, etc. where the amount of radioactivity is given in terms of the number of (short) pulses per given time interval. With these known devices a scaler to reduce the number of pulses per second as well as a rate meter to give an electrical amplitude proportional to the number of pulses per second are used. These devices are not needed with my detector, since the response to radioactivity is initially an electrical amplitude. This amplitude is an alternating current most easily amplified, as has been mentioned. Where the direct current envelope thereof is required this is obtained by the rectification circuit 26 shown.

Accordingly, I have been able to accomplish a great simplification in radioactivity well logging, both downhole and above ground.

While I have specified numerous materials, electrical values, proportions, arrangement and sizes for my preferred embodiment in order to clearly set it forth, it will be understood that various modifications may be made therein and still remain within the scope of my invention.

An incandescent source of light 5 of about 3,000° K. has been preferred, but this may be of another nature as long as it be the equivalent. A neon glow lamp, however, was not found to be the equivalent.

The several values of voltages, constants of radioactivity, and characteristics of circuit elements given in this specification have been by way of example only, and others may take reasonably wide departures therefrom without departing from the inventive concept.

Having thus fully described my invention and the manner in which it is to be practiced, I claim:

1. A detector of radioactivity comprising a germanium transistor having electrodes, a resistor connected to each of said electrodes, an oscillatory circuit also connected to said transistor, a copper electrode contacting the germanium material of said transistor, a source of visible light to illuminate said germanium, an amplifier connected to said oscillatory circuit, a rectifier connected to said amplifier, and an electrical indicating instrument connected to said rectifier; said resistors adjusted to inhibit oscillation of said oscillatory circuit except upon radioactive irradiation of the germanium structure; said amplifier, rectifier and indicating instrument constituted and connected to give upon said indicating instrument a measure of such irradiation.

2. A detector of gamma rays comprising a pnp germanium triode transistor having electrodes, a resistor directly connected to each of said electrodes, an inductance-capacitance resonant circuit connected to two of the said electrodes of said transistor, one connection of said resonant circuit connected directly to one electrode and the other through one of said resistors, a copper electrode contacting the *n* germanium material of said transistor, a source of yellow light to illuminate said germanium, an amplifier connected to said resonant circuit, a voltage-doubler full-wave rectifier connected to said amplifier, and an electrical indicating instrument connected to said rectifier; said copper electrode, said source of light and said resistors adjusted to just inhibit oscillation of said oscillatory circuit in such a manner that irradiation of the germanium structure with gamma rays causes oscillation of said resonant circuit; said amplifier, rectifier and indicating instrument constituted and connected to give an indication of such irradiation by means of said indicating instrument.

3. A detector of radioactivity comprising a germanium semiconductor having electrodes, a resistive impedance connected to at least one of said electrodes, an inductance-capacitance resonant circuit connected to one of said electrodes, conductive and radiative means coactive upon said germanium semiconductor to inhibit electrical oscillation of said resonant circuit except upon radioactive irradiation of said germanium semiconductor, means to sense amplitude of electrical oscillation connected to said resonant circuit; the recited structure thus constituted and adjusted to give a measure of said radioactive irradiation by the response of said means to sense amplitude of electrical oscillation.

4. A detector of radioactivity comprising a germanium semiconductor having electrodes, a resistive impedance connected to at least one of said electrodes, an oscillatory resonant circuit connected to one of said electrodes through said resistive impedance, an electrode of high electrical conductivity in contact with said semiconductor, means to illuminate said germanium semiconductor with visible electromagnetic energy, electrical amplitude indicating means connected to said oscillatory circuit; at least one of said resistive impedances adjusted to inhibit electrical oscillation of said oscillatory resonant circuit except upon radioactive irradiation of said germanium semiconductor; the recited structure thereby constituted and adjusted to cause said electrical amplitude indicating means to measure said radioactive irradiation.

5. A detector of radioactivity comprising a germanium semiconductor having electrodes, a resistive impedance connected to each of said electrodes, an oscillatory circuit also connected to said electrodes, a further electrode having the electrical characteristics of copper in contact with said semiconductor, an amplifier connected to said oscillatory circuit, means-to-measure the amplitude of electrical oscillation connected to said amplifier; at least one of said resistive impedances adjusted to inhibit oscillation of said oscillatory circuit except upon radioactive irradiation of said germanium semiconductor; the recited structure thereby constituted and adjusted to cause said means-to-measure to measure the radioactive irradiation.

6. A detector of radioactivity comprising a germanium semiconductor having electrodes, a resistive impedance connected to each of said electrodes, an oscillatory circuit also connected to said electrodes, a source of visible radiation to illuminate said germanium semiconductor, an amplifier connected to said oscillatory circuit, means-to-measure the amplitude of electrical oscillation connected to said amplifier; at least one of said resistive impedances adjusted to inhibit oscillation of said oscillatory circuit in the presence of the illumination upon said germanium semiconductor except upon radioactive irradiation of said germanium semiconductor; the recited structure thereby constituted and adjusted to cause said means-to-measure to measure said radioactive irradiation.

References Cited in the file of this patent

UNITED STATES PATENTS

| | | |
|---|---|---|
| 2,496,886 | Molloy et al. | Feb. 7, 1950 |
| 2,706,790 | Jacobs | Apr. 19, 1955 |
| 2,728,861 | Glass | Dec. 27, 1955 |
| 2,760,078 | Youmans | Aug. 21, 1956 |
| 2,839,678 | DeWitz | June 17, 1958 |
| 2,957,081 | Chapman | Oct. 18, 1960 |